United States Patent
Kim et al.

(10) Patent No.: US 12,131,156 B1
(45) Date of Patent: Oct. 29, 2024

(54) MANYCORE SYSTEM FOR PERFORMING EXECUTION OF MULTI-THREADS IN ASYNCHRONOUS MANNER

(71) Applicant: MetisX CO., Ltd., Yongin-Si (KR)

(72) Inventors: Ju Hyun Kim, Yongin-si (KR); Do Hun Kim, Yongin-si (KR); Kwang Sun Lee, Yongin-si (KR); Jae Wan Yeon, Yongin-si (KR)

(73) Assignee: MetisX CO., Ltd., Yongin-Si (KR)

( * ) Notice: Subject to any disclaimer, the term of this patent is extended or adjusted under 35 U.S.C. 154(b) by 0 days.

(21) Appl. No.: 18/626,753

(22) Filed: Apr. 4, 2024

(30) Foreign Application Priority Data

Apr. 7, 2023 (KR) .......................... 10-2023-0046122

(51) Int. Cl.
G06F 9/30 (2018.01)
G06F 9/38 (2018.01)
G06F 9/50 (2006.01)

(52) U.S. Cl.
CPC .......... *G06F 9/3009* (2013.01); *G06F 9/3885* (2013.01); *G06F 9/5027* (2013.01); *G06F 2209/5018* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 7,882,339 | B2 * | 2/2011 | Jacobson | G06F 9/3842 712/244 |
| 8,468,526 | B2 * | 6/2013 | Saha | G06F 9/30087 718/100 |

(Continued)

FOREIGN PATENT DOCUMENTS

| | | |
|---|---|---|
| KR | 10-2011-0099895 A | 9/2011 |
| KR | 10-2012-0038879 A | 4/2012 |

(Continued)

OTHER PUBLICATIONS

"Godson-T: An Efficient Many-Core Architecture for Parallel Program Executions" by Fan et al., Journal of Computer Science and Technology 24(6): 1061-1073 Nov. 2009. (Year: 2009).*

(Continued)

*Primary Examiner* — Steven G Snyder
(74) *Attorney, Agent, or Firm* — Studebaker & Brackett PC

(57) ABSTRACT

The present disclosure relates to a manycore system capable of asynchronous execution of a plurality of threads. The manycore system includes a device memory configured to store data associated with a job requested to be offloaded from a host device, and a plurality of clusters. Each cluster includes a plurality of cores configured to execute a plurality of threads associated with a plurality of tasks included in the job and a management module configured to control asynchronous execution of the plurality of threads by the plurality of cores. Each core includes a plurality of fetch units configured to fetch, from the program memory, instructions (Continued)

associated with threads executed on the cores, one or more execution units configured to execute operations associated with the threads executed on the cores, and a plurality of load and store units configured to load and store data associated with the threads executed on the cores.

9 Claims, 6 Drawing Sheets

(56) References Cited

U.S. PATENT DOCUMENTS

| | | | |
|---|---|---|---|
| 8,689,215 B2* | 4/2014 | Hankins | G06F 9/4812 |
| | | | 718/100 |
| 8,694,706 B2* | 4/2014 | Dice | G06F 9/526 |
| | | | 710/200 |
| 8,966,491 B2* | 2/2015 | Calciu | G06F 9/526 |
| | | | 707/704 |
| 9,715,392 B2* | 7/2017 | Venkumahanti | G06F 9/3851 |
| 11,200,058 B2* | 12/2021 | Venkumahanti | G06F 9/3851 |
| 11,436,118 B2* | 9/2022 | Weissmann | G06F 11/3058 |
| 11,494,188 B2 | 11/2022 | Dasika et al. | |
| 2006/0294326 A1* | 12/2006 | Jacobson | G06F 9/3861 |
| | | | 712/E9.05 |
| 2008/0005737 A1* | 1/2008 | Saha | G06F 9/3004 |
| | | | 718/100 |
| 2008/0148259 A1* | 6/2008 | Hankins | G06F 9/3851 |
| | | | 718/100 |
| 2009/0138880 A1* | 5/2009 | Yafimau | G06F 12/0897 |
| | | | 712/205 |
| 2012/0096471 A1 | 4/2012 | Jang et al. | |
| 2013/0290583 A1* | 10/2013 | Dice | G06F 9/526 |
| | | | 710/200 |
| 2013/0290967 A1* | 10/2013 | Calciu | G06F 9/526 |
| | | | 718/102 |
| 2013/0339771 A1 | 12/2013 | Ryu | |
| 2015/0324239 A1* | 11/2015 | Venkumahanti | G06F 9/3851 |
| | | | 718/104 |
| 2023/0144662 A1* | 5/2023 | Tasinga | G06F 9/5088 |
| | | | 718/105 |
| 2024/0095077 A1* | 3/2024 | Singh | G06F 9/5027 |
| 2024/0176663 A1* | 5/2024 | Hirisave Chandra Shekhara | |
| | | | G06F 9/5027 |

FOREIGN PATENT DOCUMENTS

| | | | | |
|---|---|---|---|---|
| KR | 10-2013-0141218 A | 12/2013 | | |
| KR | 10-1346135 B1 | 12/2013 | | |
| KR | 10-2015-0047422 A | 5/2015 | | |
| KR | 10-2016-0080385 A | 7/2016 | | |
| KR | 10-2016-0141001 A | 12/2016 | | |
| KR | 10-2017-0062493 A | 6/2017 | | |
| WO | 2010/033569 A1 | 3/2010 | | |
| WO | WO-2010126868 A1 * | 11/2010 | | G06F 11/1497 |
| WO | 2014/051736 A1 | 4/2014 | | |
| WO | 2016/049095 A1 | 3/2016 | | |

OTHER PUBLICATIONS

"Request for the Submission of an Opinion" Office Action issued in KR 10-2023-0046122; mailed by the Korean Intellectual Property Office on Aug. 23, 2023.

"Written Decision on Registration" Office Action issued in KR 10-2023-0046122; mailed by the Korean Intellectual Property Office on Feb. 26, 2024.

* cited by examiner

MANYCORE SYSTEM FOR PERFORMING EXECUTION OF MULTI-THREADS IN ASYNCHRONOUS MANNER

CROSS-REFERENCE TO RELATED APPLICATION

This application is based on and claims priority to Korean Patent Application No. 10-2023-0046122, filed on Apr. 7, 2023, in the Korean Intellectual Property Office, the disclosure of which is incorporated herein by reference in its entirety.

TECHNICAL FIELD

The disclosure relates to a manycore system that includes a plurality of clusters, and specifically, to a manycore system that includes a plurality of cores configured to execute a job requested to be offloaded from a host device as one or more threads and that is capable of asynchronous execution of a plurality of threads by the plurality of cores.

BACKGROUND

In general, a manycore system may refer to a computer architecture with multiple processor cores on a single chip. The manycore system can distribute the workload of the program requested to be offloaded by the host processor to multiple process cores, thereby improving the performance of parallel computing jobs for the corresponding workload. Since the manycore system can provide significant performance improvements compared to the existing single-core, dual-core systems, etc., demand is increasing in fields that require a large amount of computing resources, such as artificial intelligence model learning.

Meanwhile, multithreading is a computer programming technique that allows a plurality of threads or command sequences to be launched concurrently within a single process. In manycore systems, multithreading allows multiple jobs related to an application to be launched concurrently, thereby improving the performance of the application. The multi-threading method includes a multi-threading method by an operating system and a hardware multi-threading method.

The multi-threading method by the operating system is generally more flexible and widely supported, but there is a problem that overhead may occur and processing speed may be lowered due to context switching between threads. Additionally, hardware multithreading by GPU has the problem of being inflexible because all threads processed in parallel start and end synchronously.

SUMMARY

In order to solve one or more problems (e.g., the problems described above and/or other problems not explicitly described herein), the present disclosure provides a manycore system (apparatus).

The present disclosure may be implemented in a variety of ways, including a method, a system (apparatus), or a non-transitory computer-readable recording medium storing instructions.

A manycore system capable of asynchronous execution of a plurality of threads, may include a device memory configured to store data associated with a job requested to be offloaded from a host device, and a plurality of clusters, wherein each of the plurality of clusters may further include a program memory configured to store a program associated with the job requested to be offloaded, a plurality of cores configured to execute a plurality of threads associated with a plurality of tasks included in the job and a management module configured to control asynchronous execution of the plurality of threads by the plurality of cores, each of the plurality of cores may include a plurality of fetch units configured to fetch, from the program memory, instructions associated with threads executed on the cores, one or more execution units configured to execute operations associated with the threads executed on the cores, and a plurality of load and store units configured to load and store data associated with the threads executed on the cores, and each of the plurality of threads executed on the cores may share and use the one or more execution units and may independently issue a fetch command to independently fetch an instruction using at least one of the plurality of fetch units, and may independently issue a load and store command to independently load or store data using at least one of the plurality of load and store units.

Each of the plurality of cores may include a plurality of thread areas configured to independently track an execution state of each of the plurality of threads executed on the cores, and a maximum number of threads that can be executed concurrently on one core may be the same as a number of thread areas included in the core.

Each of the plurality of thread areas may include a program counter configured to store information on an address of an instruction that each thread is executing and a register file configured to store an intermediate value of the operation that each thread is executing.

Each of a plurality of threads executing on a specific core of the plurality of cores may be executed on the specific core from launch to termination of each of the plurality of threads.

Each of a plurality of threads executing on a specific core of the plurality of cores may be executed using a thread area independently allocated to the thread.

Each of the plurality of cores may be further configured to, while processing a pipeline of a first thread executed on the core, perform a context switching at a time point when a pipeline stall is expected so as to process a pipeline of a second thread executed on the core.

Each of the plurality of clusters may further include a first cache memory configured to cache the data stored in the device memory.

Each of the plurality of clusters may further include one or more second cache memories associated with the plurality of cores included in the cluster, and the second cache memory may be configured to cache the data stored in the device memory or the first cache memory.

Each of the plurality of clusters may further include one or more instruction cache memories associated with the plurality of cores included in the cluster, the instruction cache memory may be configured to cache instructions stored in the program memory, and each of the plurality of cores may include a plurality of fetch units configured to fetch, from the instruction cache memory or the program memory, instructions associated with the thread executed on the core.

According to some aspects of the present disclosure, it is possible to obtain improved performance of an application (e.g., an application related to big data analysis) that has frequent memory accesses and requires parallel processing.

According to some aspects of the present disclosure, using an independent thread context for each thread, context switching can be performed at no additional cost for the instructions in which a pipeline stall (e.g., instruction cache miss, data cache miss, branch miss, execution unit busy, etc.) is expected.

According to some aspects of the present disclosure, each thread executing concurrently on one core uses an independent fetch unit and/or load and store unit, so that it is possible to prevent pipeline stall.

According to some aspects of the present disclosure, by sharing some hardware resources in units of clusters or cores, it is possible to reduce infrastructure costs and efficiently perform jobs.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
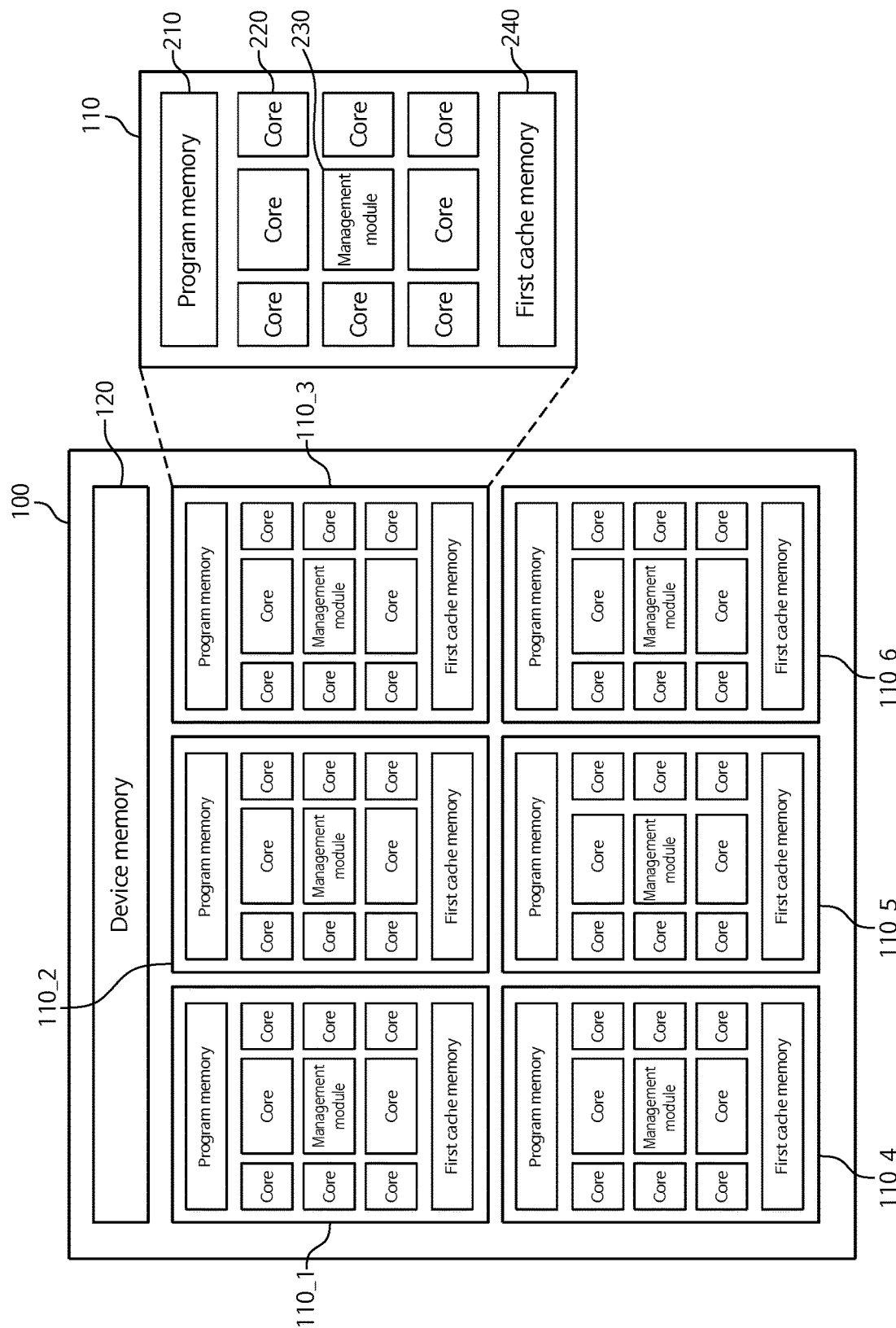
FIG. 1 is a block diagram illustrating an internal configuration of a manycore system.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In this disclosure, "offloading" may refer to transferring data from a local device or network to another device or network to reduce the amount of data that needs to be processed or stored in the local device or network, or to improve the performance of an application by assisting the processing performance of the local device. For example, offloading may refer to requesting specific jobs (e.g., data processing, storage, operations, etc.) or workloads associated with the application from the host device to another device so as to improve the performance of the application by securing resources of the host device or utilizing resources of other devices.

In the disclosure, a "task" may refer to a unit of job to be performed by a system or such unit job. For example, a job may be a set of tasks, and the job may include one or more standalone tasks and/or a plurality of tasks that should be completed in a specific order.

In the disclosure, a "thread" may refer to a unit launch flow within a process. Additionally or alternatively, the "thread" may refer to a specific hardware area (e.g., a specific memory area, etc.) to which such launch flow is allocated. In some aspects of the present disclosure, the term "thread" may be used interchangeably with the term "thread area" to be described below.

The term "thread area" as used herein may refer to an area including a hardware module for independently executing a thread. One core may include a plurality of thread areas for independently executing a plurality of threads, and each thread area may include thread contexts (e.g., program counters and register files) for tracking the state of the executing thread using each thread area. One thread may be allocated to one thread area, and a thread allocated to a specific thread area of a specific core may be executed using a thread context included in the specific thread area.

FIG. 1 is a block diagram illustrating an internal configuration of a manycore system 100. The manycore system 100 may perform a job requested to be offloaded from the host device. The job requested to be offloaded from the host may include a plurality of tasks, and the plurality of tasks may be performed as a plurality of threads in the clusters 110_1 to 110_6 included in the manycore system 100. For example, a plurality of tasks may be performed as the plurality of threads allocated to one cluster (or the plurality of cores included in one cluster) or as the plurality of threads allocated to a plurality of clusters (or a plurality of cores included in each of the plurality of clusters).

Referring to FIG. 1, the manycore system 100 may include a plurality of clusters 110_1 to 110_6 and a device memory 120.

The cluster 110 may be a basic unit that forms the manycore system 100. In FIG. 1, a manycore system including six clusters is illustrated as an example, but aspects are not limited thereto, and the manycore system 100 may be a scalable computing structure that may include any number of clusters 110 based on a cluster as a basic unit.

The device memory 120 may be a memory that stores data associated with the job requested to be offloaded from the host device.

Each cluster 110 may include a program memory 210, a plurality of cores 220, a management module 230, and a first cache memory 240. In FIG. 1, a cluster 110 including eight cores is illustrated as an example, but aspects are not limited thereto, and the cluster 110 may include any number of cores 220.

The program memory 210 may be a memory used to store a program (i.e., instructions) associated with the job requested to be offloaded. The plurality of cores 220 included in one cluster 110 may share one program memory 210 to execute the same program. Alternatively, the plurality of cores 220 included in one cluster 110 may execute several different programs according to the configuration of the program memory 210.

Each of the plurality of cores 220 may be a processing device configured to perform basic arithmetic, logic, and input/output operations to process the commands of the program. Additionally or alternatively, each of the plurality of cores 220 may be configured to manage, process and/or store information and/or data received from a plurality of external devices and systems. Each of the plurality of cores 220 may execute one or more threads allocated or distributed to each core. Hardware-wise, each of the plurality of cores 220 may be configured to simultaneously execute a plurality of threads. This will be described below in more detail with reference to FIG. 3.

The management module 230 may perform management jobs associated with the threads and control the execution of threads of the plurality of cores 220. The management module 230 may include a separate hardware device or software code associated with the plurality of cores 220. The management module 230 may generate a thread for each of the plurality of tasks based on job information associated with the plurality of tasks according to an offloading request of the host device, and allocate the generated thread to at least one core in the cluster. In addition, the management module 230 may control execution, termination, etc. of the threads of at least one core. Instead of synchronous launch and termination, a plurality of threads may launch and terminate asynchronously under the control of the management module 230.

The first cache memory 240 may refer to a small amount of high-speed memory used for storing frequently accessed data. The first cache memory 240 may be configured to cache the data stored in the device memory 120. In the manycore system 100, a plurality of cores may have their own first cache memory 240 or share the same, which may reduce the number of times the plurality of cores 220 have to access the main memory (e.g., RAM) for loading or storing data, thereby improving performance. The first cache memory 240 may include a level 1 (L1) cache memory.

The manycore system 100 illustrated in FIG. 1 is merely an example, and does not illustrate all configurations of the cluster 110, and thus other configurations not illustrated may be further included. For example, each of the plurality of clusters 110_1 to 110_6 may further include one or more co-processors and/or one or more second cache memories. This will be described below in detail with reference to FIG. 2.

Figure 2:
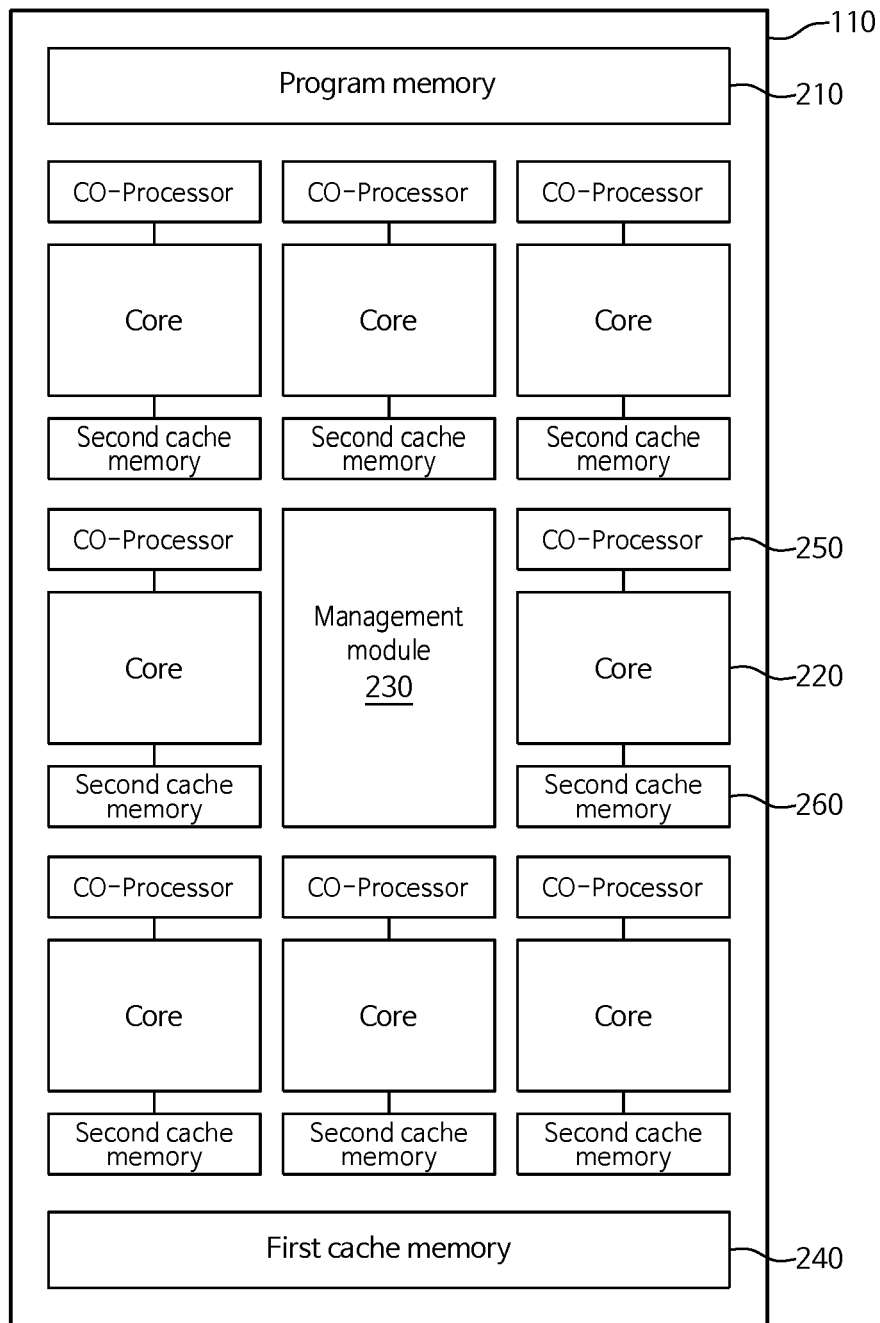
FIG. 2 is a block diagram illustrating an internal configuration of the cluster.

FIG. 2 is a block diagram illustrating an internal configuration of the cluster 110. The cluster 110 may include the program memory 210, the plurality of cores 220, the management module 230, the first cache memory 240, one or more co-processors 250, and one or more second cache memories 260. In the following description with reference to FIG. 2, description of those overlapping with the internal configurations of the cluster 110 described in FIG. 1 will be omitted, and only the newly added configurations in FIG. 2 will be described in detail.

The co-processor 250 may be a processor for assisting the operation of the core 220. For example, the co-processor 250 may be a processor configured to perform operations that are not implemented as execution units inside the core 220 because they are not performed frequently, but have significant performance improvements when hardware support is provided. FIG. 2 illustrates that a plurality of co-processors 250 associated with each of the plurality of cores 220 are individually included, but aspects are not limited thereto. The individual co-processor 250 may be used for each of the plurality of cores 220, or the plurality of cores 220 may share and use one or more co-processors 250 according to the required performance or functional characteristics of the manycore system 100 or the cluster 110.

The second cache memory 260 may be a cache memory configured to cache data and/or instructions to reduce the number of accesses to an external memory with a relatively long access latency. The second cache memory 260 may be an L0 data cache configured to cache the data stored in the device memory 120 or the first cache memory 240. In this case, the second cache memory 260 may have a higher memory layer than the first cache memory 240. Additionally or alternatively, the second cache memory 260 may be an L0 instruction cache memory configured to cache the instructions stored in the program memory 210. In this case, the second cache memory 260 may have a higher memory layer than the program memory 210.

The second cache memory 260 may be located very close to the core 220 such that the core 220 may refer to the data and/or instructions within only one cycle. This may reduce the number of times the plurality of cores 220 have to access the external memory for storage or loading of data and/or instructions, thereby reducing latency and improving performance.

FIG. 2 illustrates that a plurality of second cache memories 260 associated with each of the plurality of cores 220 are individually included, but aspects are not limited thereto. The second cache memory 260 may be used for each of the plurality of cores 220 or the plurality of cores 220 may share and use one or more second cache memories 260 according to the required performance or functional characteristics of the manycore system 100 or the cluster 110.

In FIGS. 1, 2, and the above description, the internal configurations of any one cluster 110 are illustrated and described for convenience of explanation, but it is to be understood that all of the plurality of clusters 110_1 to 110_6 included in the manycore system 100 may be configured to be the same as or similar to FIGS. 1, 2 and the description described above.

Figure 3:
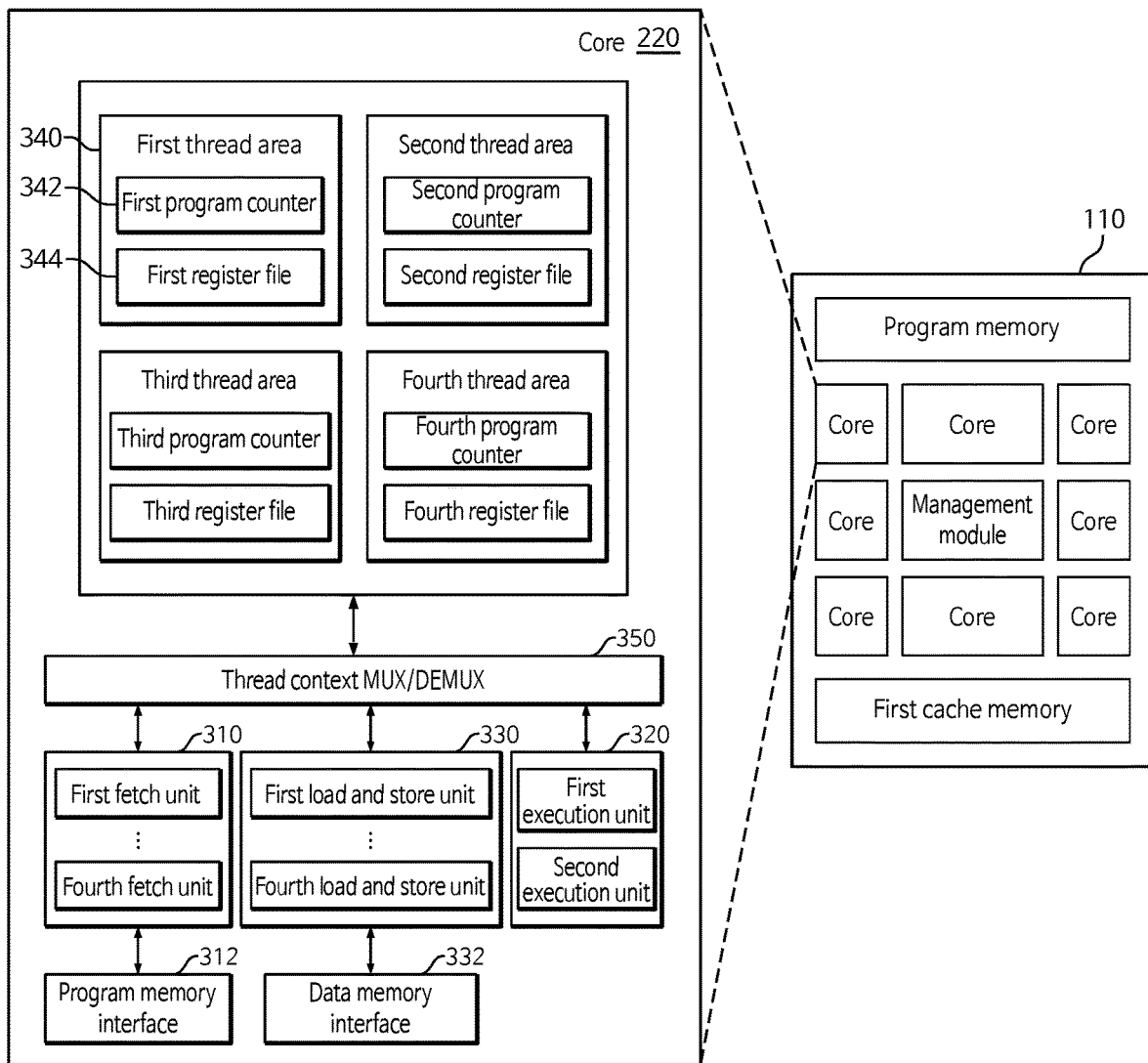
FIG. 3 is a block diagram illustrating an internal configuration of the core.

FIG. 3 is a block diagram illustrating an internal configuration of the core 220. The core 220 may include one or more fetch units 310, one or more execution units 320, one or more load and store units 330, and a plurality of thread areas 340.

The fetch unit 310 may be configured to retrieve or fetch an instruction associated with the executing thread in the core 220. The fetch unit 310 may retrieve or fetch an instruction stored in a memory (e.g., a program memory, a cache memory, etc.) through the program memory interface 312.

The execution unit 320 may be configured to execute an operation associated with the executing thread in the core 220. The core 220 may include a plurality of execution units 320 for each type of operation and/or may include the plurality of execution units 320 that perform the same operation. Each executing thread in the core 220 may share and use one or more execution units 320 included in the core 220.

The load and store unit 330 may be configured to load and store data associated with the executing thread in the core 220. The load and store unit 330 may load data stored in a memory (e.g., cache memory, device memory, etc.) through the data memory interface 332 or store the data in the memory.

The core 220 may include a plurality of fetch units 310 and a plurality of load and store units 330. Each executing thread in the core 220 may issue the fetch command independently of the other threads so as to independently retrieve or fetch the instruction using at least one of the plurality of fetch units 310 included in the specific core 220. Likewise, each executing thread in the core 220 may issue a load and store command independently of the other threads so as to independently load or store the data using at least one of the plurality of load and store units 330 included in the specific core 220. The result value for the fetch command or load and store command issued by each thread is independent of each other between each thread and may be processed regardless of the order in which the results are returned. Note that, if a plurality of commands are issued within one thread, the plurality of commands should be processed in accordance with the order defined in the program. A device for issuing an independent command and processing a result between these threads, and ensuring an order for each thread may be present independently for each thread.

The plurality of thread areas 340 may refer to an area including a hardware module for independently executing each of the plurality of threads executed in the core. Each of the thread areas 340 may include a thread context for tracking the state of the thread that is executed using each thread area 340. In addition, each thread context may include a program counter 342 configured to store information on an address of the instruction that the thread is executing, and a register file 344 configured to store the intermediate value of the operation that each thread is executing.

One thread may be allocated to one thread area. In this case, the maximum number of threads that may be executed simultaneously in one core 220 may be the same as the number of thread areas 340 included in the core 220. For example, in the illustrated example, since the core 220 includes four thread areas, the core 220 may execute up to four threads at the same time. If six cores 220 are included in the cluster 110, one cluster 110 may execute up to 24 threads at the same time. The thread allocated to a specific thread area 340 of a specific core 220 may be executed using the thread context included in the specific thread area 340.

Under this configuration, the core 220 may independently execute a plurality of threads at the same time. In addition, unlike the software multi-threading method that requires backup and recovery of the thread contexts under the control of the operating system for context switching, context switching may be performed without any delay (cost-free) using independent (or dedicated, or exclusive) thread contexts for each thread.

The fetch unit 310, the execution unit 320, and the load and store unit 330 may be connected to a plurality of thread areas 340 (e.g., thread context) through the thread context multiplexer/demultiplexer (MUX/DEMUX) 350. The thread context MUX/DEMUX 350 may select which thread is executed in which clock cycle and transmit the context of the selected thread to the fetch unit 310, the execution unit 320, or the load and store unit 330. In addition, the thread context MUX/DEMUX 350 may select a thread context to store the execution result after the fetch unit 310, the execution unit 320, or the load and store unit 330 executes a fetch command, operation, or load and store command associated with a specific thread.

In FIG. 3 and the above description, an example of the internal configuration of any one core 220 included in the cluster 110 is illustrated and described for convenience of explanation, but it is to be understood that all of the plurality of cores included in the cluster 110 may be configured to be the same as or similar to FIG. 3 and the description described above.

The internal configurations of the cluster 110 and the core 220 illustrated in FIGS. 2 and 3 are merely examples, and in some examples, configurations other than the internal configuration illustrated herein may be additionally included, and some configurations may be omitted. In addition, although the internal configurations of the cluster 110 and the core 220 are separated by functions and described with reference to FIGS. 2 and 3, this does not necessarily mean that they are physically separated.

Figure 4:
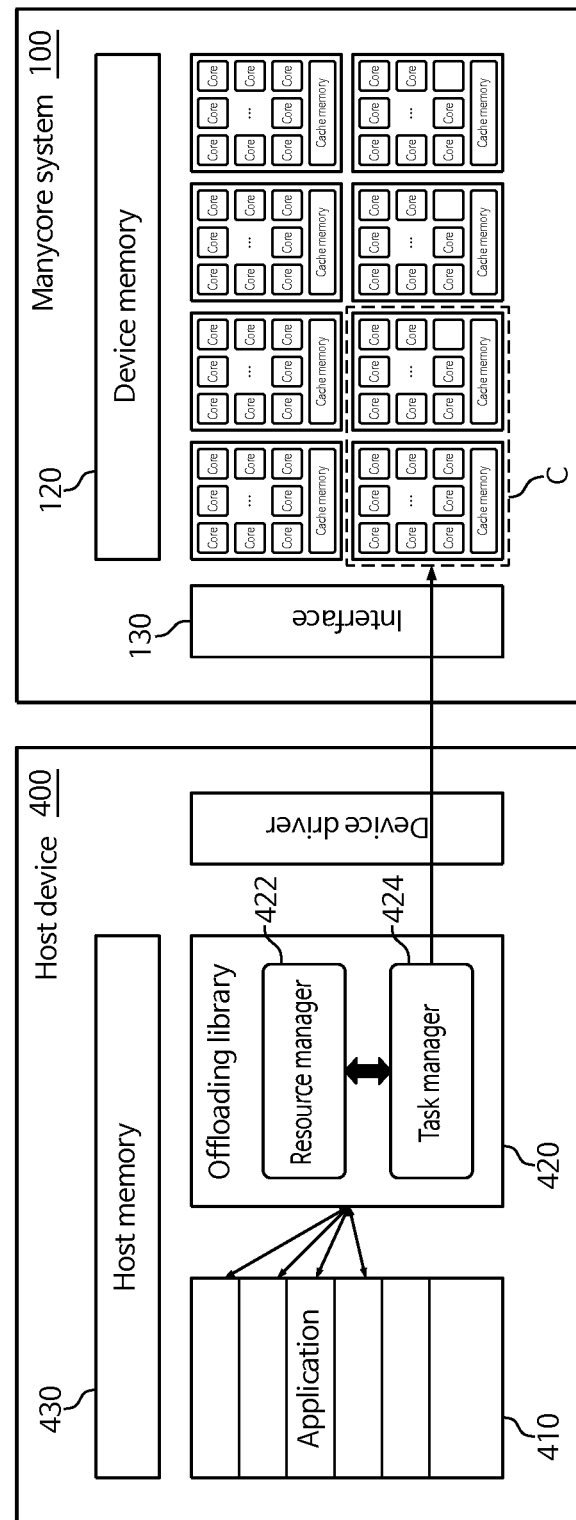
FIG. 4 illustrates an example in which a plurality of tasks requested to be offloaded from the host device are allocated to the cluster of the manycore system.

FIG. 4 illustrates an example in which a plurality of tasks requested to be offloaded from the host device 400 are allocated to the cluster C of the manycore system 100. The host device 400 may request the manycore system 100 to process a specific job associated with the application so as to utilize the resources of the manycore system 100 and thus improve the performance of the application.

For example, the host device 400 may generate a task per unit (e.g., per file) capable of parallel processing for a job (e.g., a data compression/decompression job, etc.) through a specific application 410 according to a user's request and request offloading through the offloading library 420. The specific application 410 may be an application that is previously set to be offloaded.

The offloading library 420 may be a set of functions that receive an offloading request for a job from the application 410 and help execute the job in the manycore system 100. The offloading library 420 may include a resource manager 422 that manages resources of the manycore system 100 and a task manager 424 that manages execution and termination of the tasks of the manycore system 100.

The offloading library 420 requested to offload the job from the application 410 may allocate the job to one or more clusters C of a plurality of clusters in the manycore system 100. For example, the offloading library 420 may determine, during the initial setup process, a number of clusters to be used for offloading among the plurality of clusters in the manycore system 100, and select the clusters of the available clusters according to the determined number. If there is a request for offloading for the job, the offloading library 420 may determine which of the selected clusters is allocated with the job. In this process, the task manager 424 of the offloading library 420 may estimate the job load for each cluster through the existing task allocation state and the waiting queue state. The offloading library 420 may use the estimated job load information to allocate a job to one or more clusters C having a relatively lower job load. When all the offloaded job ends, the allocated cluster C may be returned and treated as an available cluster.

The offloading library 420 may download the application 410 for performing the job to the cluster C allocated with the job (e.g., the program memory of the cluster C) and initialize the same. In addition, the offloading library 420 may transfer data for the job from the host memory 430 to the device memory 120 in the manycore system 100. As a specific example, the offloading library 420 may allocate as many memories of the manycore system 100 as necessary, and transmit the memory allocation information to the task. In addition, when the task ends, the allocated memory may be returned and treated as available memory.

All or part of the data required for the job may be loaded in the device memory, and a process of transferring the data for the job to the device memory 120 in the manycore system 100 may be omitted according to the type of interface 130 (e.g., CXL protocol) of the manycore system 100.

In FIG. 4 and the above description, the offloading library 420 allocates the job to one or more clusters C in the manycore system 100, and the allocated core and thread area are not specified. In this case, a plurality of tasks included in the job may be delivered to the management module in the cluster C allocated with the job, and the management module of the specific cluster allocated with the job may allocate or distribute tasks to the available core/thread area by referring to the state (job load) of all core and thread areas in the cluster. Instead of managing each core, the management module may distribute the jobs by independently treating all thread areas in the cluster to which the management module belongs. Alternatively, the offloading library 420 may specify not only the allocated cluster, but also the allocated core and/or thread area.

That is, a plurality of tasks may be distributed and allocated to a plurality of thread areas within one or more cores included in the cluster C allocated with the job. In this case, one or more cores may use a plurality of thread areas allocated with a plurality of tasks to perform a plurality of tasks as a plurality of threads.

According to this configuration, the job may include a plurality of tasks in sequence. In addition, a plurality of tasks in sequence may be allocated to one or more cores in a specific cluster. In this case, the management module included in the specific cluster may control one or more cores in the cluster such that the task allocated to the specific thread area starts after the task of the previous order ends.

Figure 5:
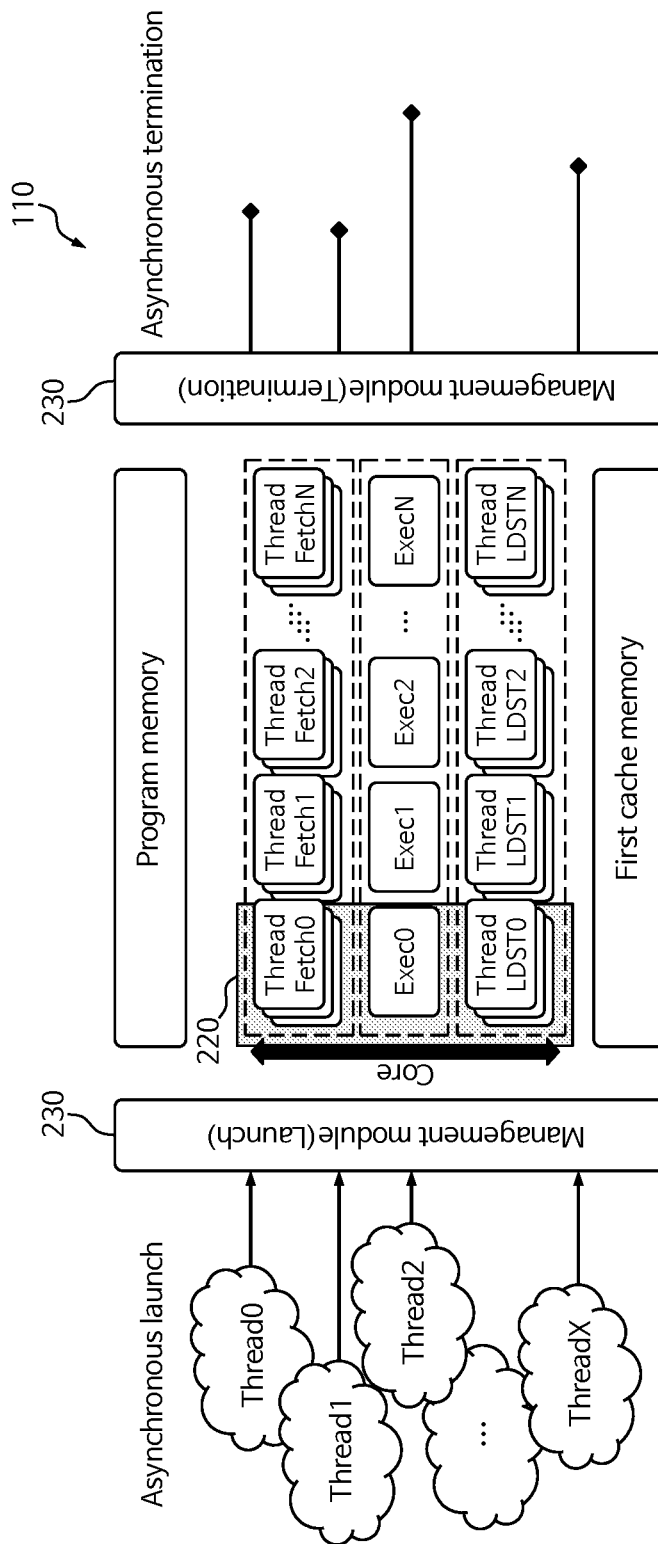
FIG. 5 is a diagram illustrating an example in which a plurality of threads are executed in the cluster.

FIG. 5 is a diagram illustrating an example in which a plurality of threads are executed in the cluster 110. The management module 230 in the cluster 110 may generate a plurality of threads for each of the plurality of tasks. In addition, the management module 230 may allocate a plurality of threads to at least one of a plurality of cores in the cluster 110 and manage the execution and termination of the allocated threads. That is, the management module 230 may execute the threads allocated to a plurality of cores or may terminate the executing thread.

Under this configuration, a plurality of threads may be executed independently. For example, instead of synchronous launch and termination, the plurality of threads may launch and terminate asynchronously under the control of the management module 230. That is, each of the plurality of threads may launch at any point in time and terminate at any point in time. In addition, threads allocated to a specific core 220 (a specific thread area within the specific core 220) may be fixed and executed in the specific core 220 (a specific thread area within the specific core 220) from launch to termination.

Each executing thread on a specific core 220 may share and use one or more execution units included in the specific core. In addition, each executing thread in the specific core 220 may independently issue a fetch command to independently retrieve or fetch instructions using at least one of the plurality of fetch units included in the specific core 220 and/or independently issue a load and store command to independently load or store data using at least one of the plurality of load and store units included in the specific core 220. This will be described below in more detail with reference to FIG. 6.

Figure 6:
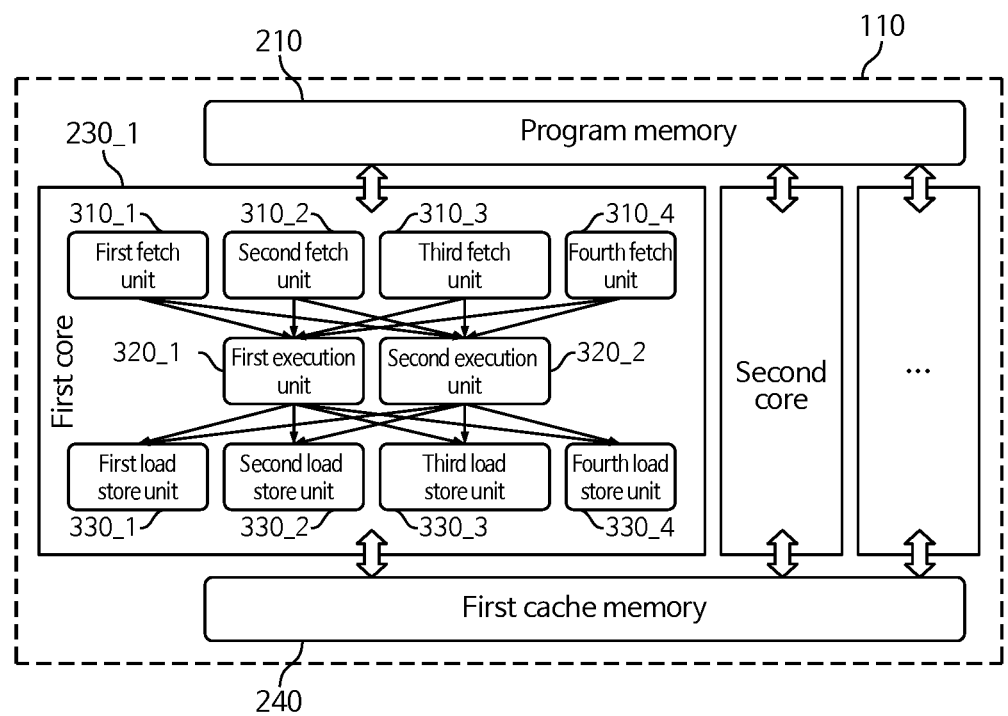
FIG. 6 is a diagram illustrating an example in which a plurality of threads are executed in one core.

FIG. 6 is a diagram illustrating an example in which a plurality of threads are executed in one core. FIG. 6 illustrates an example in which a plurality of threads are executed in the first core 230_1 in the cluster 110, but this is for convenience of explanation, and a plurality of threads may be executed in the remaining cores in the cluster 110 in the same and similar manner as in the first core 230_1.

The core may be configured to prevent a pipeline stall of an application with many memory accesses by selecting and executing the executable threads. Each executing thread in each core may be independently executed using a separate and independent (or dedicated, or exclusive) thread area. Accordingly, the core 230_1 may perform context switching at no additional cost for instructions in which a pipeline stall (e.g., instruction cache miss, data cache miss, branch miss, execution unit busy, etc.) is expected, using an independent (or dedicated, or exclusive) thread context for each thread. In addition, the core 230_1 may share a memory interface with the execution units 320_1 and 320_2 such that hardware resources are not wasted.

Specifically, the core 230_1 may include a plurality of fetch units 310_1 to 310_4, and each of the plurality of threads executed on the core 230_1 may independently retrieve or fetch the instructions using at least one of the plurality of fetch units 310_1 to 310_4 included in the core 230_1. Additionally or alternatively, the core 230_1 may include a plurality of load and store units 330_1 to 330_4, and each of the plurality of threads executed on the core 220 may independently load or store data using at least one of the plurality of load and store units 330_1 to 330_4. Under this configuration, each thread executing concurrently on one core may independently issue and execute load and store instructions that may cause a long latency, thus preventing the pipeline stall.

In addition, the plurality of cores may minimize the access to the external memory which may be relatively slow, through the program memory 210 and the first cache memory 240 (data cache). In addition, by sharing the program memory 210 and the first cache memory 240 (data cache) in a cluster unit, efficient scaling of the cluster unit may be possible while reducing infrastructure costs.

In addition, the cluster 110 may further include a second cache memory located very close to the core 230_1. For example, the second cache memory may be an L0 data cache configured to cache the data stored in the device memory or the first cache memory 240, or an L0 instruction cache memory configured to cache the instructions stored in the program memory 210. Accordingly, it is possible to reduce the number of accesses to the external memory and thus reduce latency.

Each of the plurality of threads executed in the core 230_1 may share and use one or more execution units 320_1 and 320_2 included in the core 230_1 so as prevent the decrease in the utilization of individual execution units in the application with many memory accesses. The threads executed in the core 230_1 may share and use one or more execution units 320_1 and 320_2 included in the core 230_1, and operate in a manner that makes the full use of the execution units 320_1 and 320_2 through internal scheduling. Under such a configuration, the number of thread areas of the core 230_1 and the number of execution units 320_1, 320_2 can be appropriately adjusted according to the cost, power budget, and needs of the application, etc., thereby achieving high performance relative to limited resources.

The method described above may be provided as a computer program stored in a computer-readable recording medium for launch on a computer. The medium may be a type of medium that continuously stores a program executable by a computer, or temporarily stores the program for execution or download. In addition, the medium may be a variety of writing means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A manycore system capable of asynchronous execution of a plurality of threads, comprising:
    a device memory configured to store data associated with a job requested to be offloaded from a host device; and
    a plurality of clusters,
    wherein each of the plurality of clusters further includes:
        a program memory configured to store a program associated with the job requested to be offloaded;
        a plurality of cores configured to execute a plurality of threads associated with a plurality of tasks included in the job; and
        a management module configured to control asynchronous execution of the plurality of threads by the plurality of cores,
    wherein each of the plurality of cores includes:
        a plurality of fetch units configured to fetch, from the program memory, instructions associated with threads executed on the cores;
        one or more execution units configured to execute operations associated with the threads executed on the cores; and
        a plurality of load and store units configured to load and store data associated with the threads executed on the cores, and
    wherein the one or more execution units comprises at least one execution unit configured to be shared by more than one thread of the plurality of threads,
    wherein the plurality of fetch units are configured to be independently used by a respective thread of the plurality of threads,
    wherein the plurality of load and store units are configured to be independently used by a respective thread of the plurality of threads, and
    wherein each of the plurality of threads is configured to:
        independently issue a fetch command to independently fetch an instruction, by using one of the plurality of fetch units;
        execute the independently fetched instruction by using the at least one execution unit configured to be shared by more than one thread of the plurality of threads; and
        issue a load and store command to independently load or store data, by using at least one of the plurality of load and store units.

2. The manycore system according to claim 1, wherein each of the plurality of cores includes a plurality of thread areas configured to independently track an execution state of each of the plurality of threads executed on the cores, and
    a maximum number of threads that can be executed concurrently on one core is the same as a number of thread areas included in the core.

3. The manycore system according to claim 2, wherein each of the plurality of thread areas includes:
    a program counter configured to store information on an address of an instruction that each thread is executing; and
    a register file configured to store an intermediate value of the operation that each thread is executing.

4. The manycore system according to claim 1, wherein each of a plurality of threads executing on a specific core of the plurality of cores is executed on the specific core from launch to termination of each of the plurality of threads.

5. The manycore system according to claim 2, wherein each of a plurality of threads executing on a specific core of the plurality of cores is executed on the specific core from launch to termination of each of the plurality of threads, and is executed using a thread area independently allocated to the thread.

6. The manycore system according to claim 1, wherein each of the plurality of cores is further configured to, while processing a pipeline of a first thread executed on the core, perform a context switching at a time point when a pipeline stall is expected so as to process a pipeline of a second thread executed on the core.

7. The manycore system according to claim 1, wherein each of the plurality of clusters further includes a first cache memory configured to cache the data stored in the device memory.

8. The manycore system according to claim 7, wherein each of the plurality of clusters further includes one or more second cache memories associated with the plurality of cores included in the cluster, and
    the second cache memory is configured to cache the data stored in the device memory or the first cache memory.

9. The manycore system according to claim 1, wherein each of the plurality of clusters further includes one or more instruction cache memories associated with the plurality of cores included in the cluster,
    the instruction cache memory is configured to cache instructions stored in the program memory, and
    each of the plurality of cores includes a plurality of fetch units configured to fetch, from the instruction cache memory or the program memory, instructions associated with the thread executed on the core.

* * * * *